(12) United States Patent
Takenaka

(10) Patent No.: US 8,826,335 B2
(45) Date of Patent: Sep. 2, 2014

(54) IMAGE RECEIVING APPARATUS AND LIQUID CRYSTAL TELEVISION SET

(75) Inventor: Yusuke Takenaka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 99 days.

(21) Appl. No.: 13/115,466

(22) Filed: May 25, 2011

(65) Prior Publication Data

US 2011/0292285 A1    Dec. 1, 2011

(30) Foreign Application Priority Data

May 26, 2010   (JP) ................................. 2010-120300

(51) Int. Cl.
G06F 13/00     (2006.01)
G06F 3/00      (2006.01)
H04N 5/445     (2011.01)

(52) U.S. Cl.
CPC ................................ *H04N 5/44543* (2013.01)
USPC .................. 725/43; 725/40; 725/47

(58) Field of Classification Search
CPC .............................................. H04N 5/44543
USPC ............................................. 725/40, 43, 47
See application file for complete search history.

(56) References Cited

U.S. PATENT DOCUMENTS

| 6,367,080 B1 | 4/2002 | Enomoto et al. |
| 7,499,462 B2 * | 3/2009 | MacMullan et al. .......... 370/401 |
| 2010/0138868 A1 * | 6/2010 | Sie et al. ......................... 725/46 |

FOREIGN PATENT DOCUMENTS

| JP | 10-51701 A | 2/1998 |
| JP | 10-294907 A | 11/1998 |
| JP | 2000-270312 A | 9/2000 |
| JP | 2005-217919 A | 8/2005 |
| JP | 2007-135158 A | 5/2007 |
| JP | 2008-28785 A | 2/2008 |
| JP | 2009-88634 A | 4/2009 |

OTHER PUBLICATIONS

Extended European Search Report dated May 29, 2012 (five (5) pages).

* cited by examiner

*Primary Examiner* — Hunter B Lonsberry
(74) *Attorney, Agent, or Firm* — Crowell & Moring LLP

(57) ABSTRACT

This image receiving apparatus includes a communication portion capable of receiving content through a network, and a control portion controlling a menu display region on which a menu of the content is displayed and a content display region on which information of the content is displayed independently from each other and controlling a display portion to display the menu display region and the content display region.

24 Claims, 7 Drawing Sheets

IMAGE RECEIVING APPARATUS AND LIQUID CRYSTAL TELEVISION SET

BACKGROUND OF THE INVENTION

1. Field of the Invention

The present invention relates to an image receiving apparatus and a liquid crystal television set, and more particularly, it relates to an image receiving apparatus and a liquid crystal television set each comprising a control portion displaying a content display region on which content is displayed.

2. Description of the Background Art

In general, an image receiving apparatus comprising a control portion displaying a content display region on which content is displayed is disclosed in Japanese Patent Laying-Open No. 10-294907 (1998), for example.

The aforementioned Japanese Patent Laying-Open No. 10-294907 (1998) discloses a receiving apparatus (image receiving apparatus) comprising a control portion displaying an image, menu icons (content) and textual information (information of the content) corresponding to the menu icons on a screen. In this receiving apparatus, a user operates an access button provided on a remote control, whereby the size of the image displayed on the screen is reduced, and the menu icons are displayed on blank space (content display region) with no image displayed. Then, the user operates cursor buttons and a decision button provided on the remote control, whereby a desired menu icon among the menu icons displayed on the screen is selected and decided to display textual information corresponding to the desired menu icon on the blank space.

In the receiving apparatus disclosed in the aforementioned Japanese Patent Laying-Open No. 10-294907 (1998), however, the user must operate the access button provided on the remote control to display the menu icons and further operate the cursor buttons and the decision button to select and decide the menu icon in order to display the textual information, and hence the operation for displaying the textual information (the information of the content) is disadvantageously complicated.

SUMMARY OF THE INVENTION

The present invention has been proposed in order to solve the aforementioned problem, and an object of the present invention is to provide an image receiving apparatus and a liquid crystal television set each capable of inhibiting the operation for displaying information of content from complication.

An image receiving apparatus according to a first aspect of the present invention comprises a communication portion capable of receiving content through a network, and a control portion controlling a menu display region on which a menu of the content is displayed and a content display region on which information of the content is displayed independently from each other and controlling a display portion to display the menu display region and the content display region.

As hereinabove described, the image receiving apparatus according to the first aspect is provided with the control portion controlling the menu display region on which the menu of the content is displayed and the content display region on which the information of the content is displayed independently from each other and controlling the display portion to display the menu display region and the content display region, whereby the information of the content can be displayed without displaying the menu by the control portion, and hence the operation for displaying the information of the content can be inhibited from complication, dissimilarly to a case where the information of the content is displayed through the menu display region.

In the aforementioned image receiving apparatus according to the first aspect, the control portion is preferably formed to display the menu display region and the content display region on the display portion, enlarging or reducing a size of the menu display region and a size of the content display region independently from each other. According to this structure, the menu display region and the content display region can be enlarged or reduced separately depending on whether the menu or the information of the content is displayed, dissimilarly to a case where the menu display region and the content display region are enlarged or reduced simultaneously.

In this case, the control portion is preferably formed to cause the content display region to emerge gradually while enlarging the size of the content display region and display updated information of the content on the content display region when the updated information of the content is received. According to this structure, the content display region dynamically emerges, and hence the content display region can be displayed prominently. Thus, a user can more easily recognize update of the information of the content.

In the aforementioned image receiving apparatus formed to display the menu display region and the content display region on the display portion, enlarging or reducing the size of the menu display region and the size of the content display region independently from each other, the control portion is preferably formed to arrange either the menu display region or the content display region on a side of the display portion while arranging either the content display region or the menu display region on an upper side or a lower side of the display portion, and display the menu display region and the content display region on the display portion, enlarging or reducing a length of the menu display region protruding from an end side of the display portion and a length of the content display region protruding from an end side of the display portion independently from each other. According to this structure, the menu display region and the content display region are arranged along the end side of the display portion, and hence a central portion of an image displayed on the display portion can be inhibited from being hidden by the menu display region and the content display region. The length of the menu display region protruding from the end side of the display portion and the length of the content display region protruding from the end side of the display portion can be enlarged or reduced separately depending on whether the menu or the information of the content is displayed, dissimilarly to a case where the length of the menu display region protruding from the end side of the display portion and the length of the content display region protruding from the end side of the display portion are enlarged or reduced simultaneously.

In this case, the control portion is preferably formed to arrange the menu display region on the side of the display portion while arranging the content display region on the upper side or the lower side of the display portion, and display the menu display region and the content display region on the display portion, enlarging or reducing a length of the menu display region protruding from the side of the display portion and a length of the content display region protruding from the upper side or the lower side of the display portion independently from each other. According to this structure, the menu display region is rendered longer in a vertical direction, and hence the menu can be displayed in a longitudinal direction. Further, the content display region is rendered longer in a horizontal direction, and hence the information of the content is displayed in a transverse direction when the information of the content is written horizontally such as in English, for example, whereby the information of the content can be easily viewed.

In the aforementioned image receiving apparatus in which the menu display region is arranged on the side of the display portion while the content display region is arranged on the upper side or the lower side of the display portion, the control portion is preferably formed to arrange the menu display region to extend in a longitudinal direction along the side of the display portion and arrange the content display region to extend in a transverse direction along the upper side or the lower side of the display portion while controlling the menu display region and the content display region independently from each other. According to this structure, the menu can be easily displayed in the longitudinal direction on the menu display region arranged to extend in the longitudinal direction along the side of the display portion. Further, the information of the content written horizontally such as in English, for example, can be easily displayed on the content display region arranged to extend in the transverse direction along the upper side or the lower side of the display portion.

In the aforementioned image receiving apparatus formed to display the menu display region and the content display region on the display portion, enlarging or reducing the size of the menu display region and the size of the content display region independently from each other, the control portion is preferably formed to control the menu display region and the content display region independently from each other so as to display the menu display region, reducing the size of the menu display region while not displaying the content display region in a standby state after a function of viewing the content is run on the basis of a user's operation. According to this structure, the size of the menu display region is reduced and the menu display region reduced in size is displayed, and hence the user can easily recognize that the function of viewing the content is run while the vicinity of an end side of the image displayed on the display portion is inhibited from being hidden by the menu display region.

In this case, the control portion is preferably formed to control the menu display region and the content display region independently from each other so as to maintain a state of displaying the menu display region, reducing the size of the menu display region while enlarging the size of the content display region to display the content when the standby state changes to a state where the information of the content can be viewed on the basis of a user's operation or receipt of updated information of the content. According to this structure, the size of the menu display region is reduced and the menu display region reduced in size is displayed, and hence the information of the content displayed on the content display region can be viewed while the vicinity of the end side of the image displayed on the display portion is inhibited from being hidden by the menu display region.

In the aforementioned image receiving apparatus in which the standby state changes to the state where the information of the content can be viewed on the basis of the user's operation or the receipt of the updated information of the content, the control portion is preferably formed to inform a user that updated information of the content has been received by displaying that on the display portion before the standby state changes to the state where the information of the content can be viewed, when the information of the content is updated. According to this structure, the user can easily recognize that the information of the content updated in the standby state has been received.

In the aforementioned image receiving apparatus including the standby state, the control portion is preferably formed to control the menu display region and the content display region independently from each other so as to display the menu, enlarging the size of the menu display region while not displaying the content display region when the standby state changes to a state of mode selection for changing the viewed content on the basis of a user's operation. According to this structure, the content display region is not displayed, and hence the user can select or decide from among the menu displayed on the menu display region while the vicinity of the end side of the image displayed on the display portion is inhibited from being hidden by the content display region.

In this case, the control portion is preferably so formed that a user can select whether to display the information of the content in order from the newest one or the oldest one in the state of mode selection. According to this structure, the information of the content can be easily arranged in order from the newest one or the oldest one to be displayed on the content display region.

In the aforementioned image receiving apparatus including the state of mode selection, the control portion is preferably formed to control the menu display region and the content display region independently from each other so as to display the menu, enlarging the size of the menu display region and display the information of the content, enlarging the size of the content display region when either the state where the information of the content can be viewed or the state of mode selection changes to a state of displaying both the menu and the information of the content on the basis of a user's operation. According to this structure, the user can view the information of the content displayed on the content display region while selecting or deciding from among the menu displayed on the menu display region.

In this case, the control portion is preferably formed to control the menu display region and the content display region independently from each other so as to display the information of the content, enlarging the content display region to an entire display region of the display portion other than the menu display region when the state of displaying both the menu and the content changes to a state of displaying the menu display region and the content display region fullscreen on the basis of a user's operation. According to this structure, a display area of the content display region is increased as compared with a case where the content display region is arranged on the end side of the display portion, and hence more information of the content can be displayed.

In the aforementioned image receiving apparatus according to the first aspect, the control portion is preferably formed to control the menu display region and the content display region independently from each other so as to change a screen to a state of displaying the menu display region, reducing a size of the menu display region or a state of displaying the menu, enlarging a size of the menu display region and change a state of not displaying the content display region or a state of displaying the information of the content, enlarging the size of the content display region when there is no user's operation for a certain period of time. According to this structure, display states of the menu display region and the content display region can be changed in a case where there is no user's operation for a certain period of time, and hence the user can easily recognize that he/she has not operate the image receiving apparatus for a certain period of time.

In this case, the control portion is preferably formed to reduce the menu display region or the content display region gradually when a screen changes to the state of displaying the menu display region, reducing the size of the menu display region or the state of not displaying the content display region, in a case where there is no user's operation for a certain period of time. According to this structure, the menu display region or the content display region is dynamically reduced, and hence the menu display region or the content display region can attract attention.

A liquid crystal television set according to a second aspect of the present invention comprises a receiving portion for receiving a television broadcast signal, a display portion displaying an image of the television broadcast, a communication portion capable of receiving content through a network, and a control portion controlling a menu display region on which a menu of the content is displayed and a content display region on which information of the content is displayed independently from each other and controlling the display portion to display the menu display region and the content display region.

As hereinabove described, the liquid crystal television set according to the second aspect is provided with the control portion controlling the menu display region on which the menu of the content is displayed and the content display region on which the information of the content is displayed independently from each other and controlling the display portion to display the menu display region and the content display region, whereby the information of the content can be displayed without displaying the menu by the control portion, and hence the operation for displaying the information of the content can be inhibited from complication, dissimilarly to a case where the information of the content is displayed through the menu display region.

In the aforementioned liquid crystal television set according to the second aspect, the control portion is preferably formed to display the menu display region and the content display region on the display portion, enlarging or reducing a size of the menu display region and a size of the content display region independently from each other. According to this structure, the menu display region and the content display region can be enlarged or reduced separately depending on whether the menu or the information of the content is displayed, dissimilarly to a case where the menu display region and the content display region are enlarged or reduced simultaneously.

In this case, the control portion is preferably formed to cause the content display region to emerge gradually while enlarging the size of the content display region and display updated information of the content on the content display region when the updated information of the content is received. According to this structure, the content display region dynamically emerges, and hence the content display region can be displayed prominently. Thus, a user can more easily recognize update of the information of the content.

In the aforementioned liquid crystal television set formed to display the menu display region and the content display region on the display portion, enlarging or reducing the size of the menu display region and the size of the content display region independently from each other, the control portion is preferably formed to arrange either the menu display region or the content display region on a side of the display portion while arranging either the content display region or the menu display region on an upper side or a lower side of the display portion, and display the menu display region and the content display region on the display portion, enlarging or reducing a length of the menu display region protruding from an end side of the display portion and a length of the content display region protruding from an end side of the display portion independently from each other. According to this structure, the menu display region and the content display region are arranged along the end side of the display portion, and hence a central portion of the image displayed on the display portion can be inhibited from being hidden by the menu display region and the content display region. The length of the menu display region protruding from the end side of the display portion and the length of the content display region protruding from the end side of the display portion can be enlarged or reduced separately depending on whether the menu or the information of the content is displayed, dissimilarly to a case where the length of the menu display region protruding from the end side of the display portion and the length of the content display region protruding from the end side of the display portion are enlarged or reduced simultaneously.

In this case, the control portion is preferably formed to arrange the menu display region on the side of the display portion while arranging the content display region on the upper side or the lower side of the display portion, and display the menu display region and the content display region on the display portion, enlarging or reducing a length of the menu display region protruding from the side of the display portion and a length of the content display region protruding from the upper side or the lower side of the display portion independently from each other. According to this structure, the menu display region is rendered longer in a vertical direction, and hence the menu can be displayed in a longitudinal direction. Further, the content display region is rendered longer in a horizontal direction, and hence the information of the content is displayed in a transverse direction when the information of the content is written horizontally such as in English, for example, whereby the information of the content can be easily viewed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of an image output system 100 according to an embodiment of the present invention is described with reference to FIGS. 1 to 7.

Figure 1:
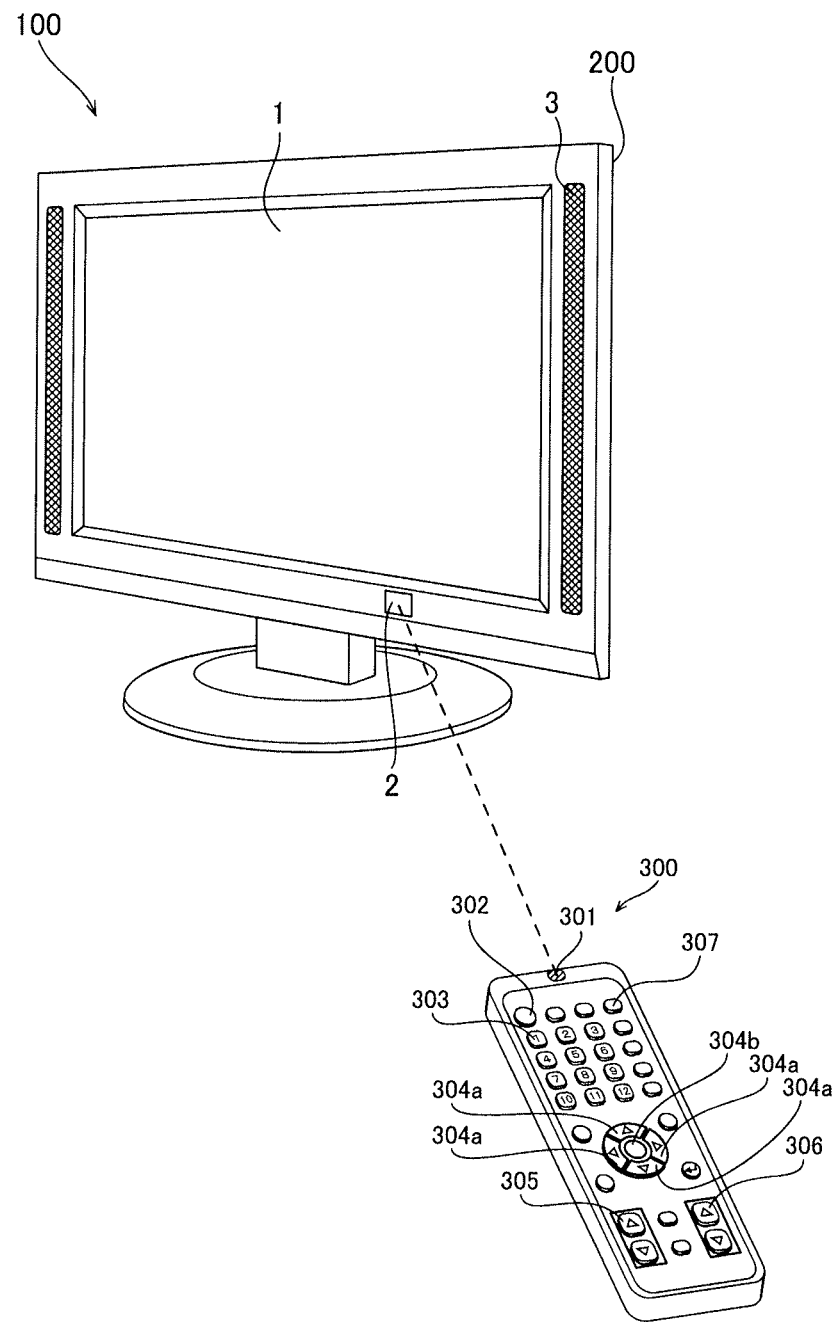
FIG. 1 is a schematic diagram of a liquid crystal television set and a remote control according to an embodiment of the present invention.

The image output system 100 according to this embodiment includes a liquid crystal television set 200 including a display portion 1 and a remote control 300 for operating screens 201 to 205, described later, displayed on the display portion 1 of the liquid crystal television set 200, as shown in FIG. 1. The liquid crystal television set 200 is an example of the "image receiving apparatus" in the present invention. The liquid crystal television set 200 further includes an infrared light receiving portion 2 for communicating with the remote control 300 through infrared light and a speaker portion 3 generating sounds.

Figure 2:
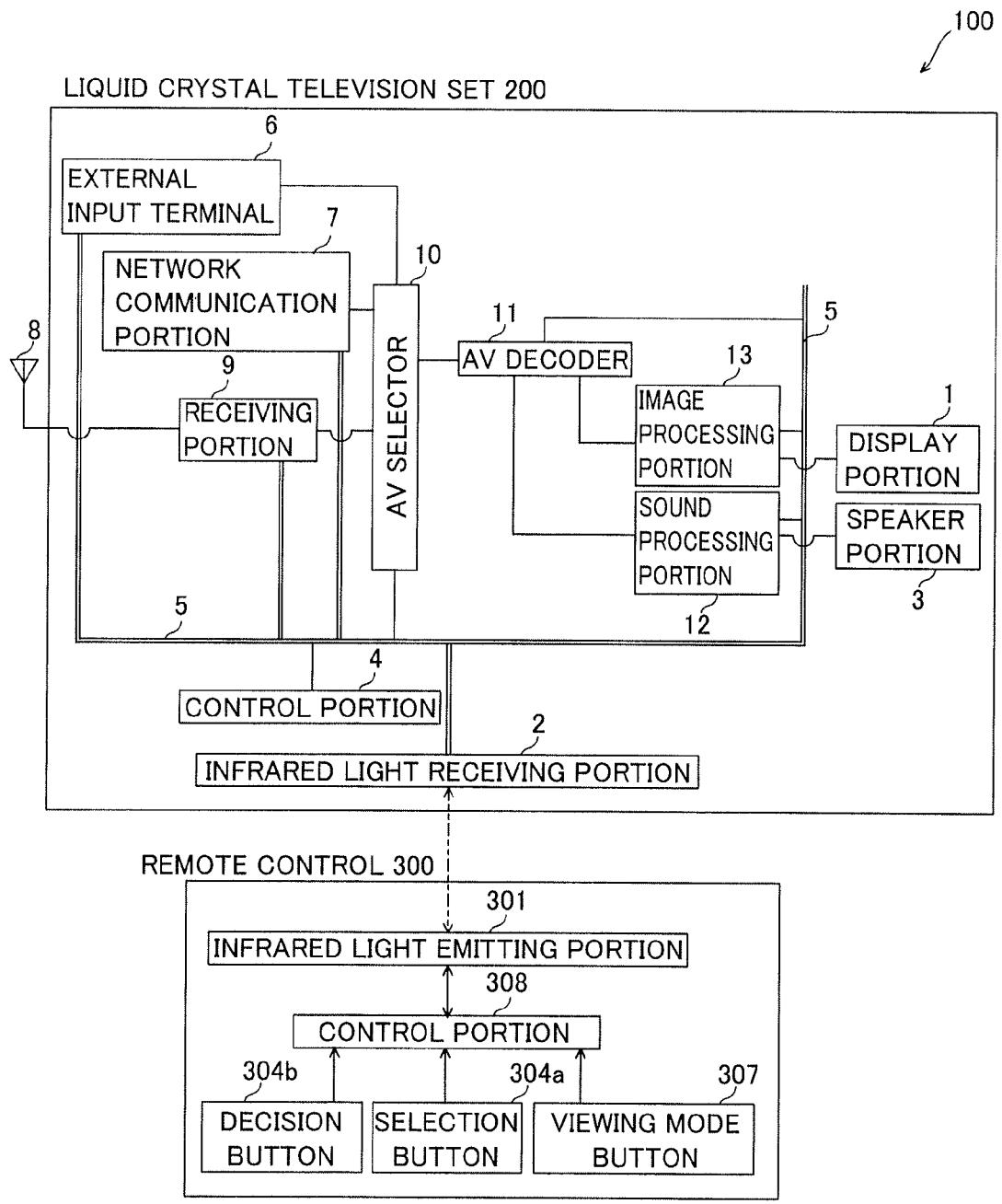
FIG. 2 is a block diagram of the liquid crystal television set and the remote control according to the embodiment of the present invention.

As shown in FIG. 2, the liquid crystal television set 200 includes a control portion 4 controlling the overall liquid crystal television set 200. The control portion 4 is connected to the infrared light receiving portion 2, an external input terminal 6, a network communication portion 7 for receiving content such as weather and news updated in real time through a network such as the Internet, a receiving portion 9 for receiving a digital television broadcast signal distributed from a broadcast station through an antenna 8, an AV selector 10, an AV decoder 11, a sound processing portion 12 and an image processing portion 13 through buses (transmission paths) 5. The network communication portion 7 is an example of the "communication portion" in the present invention.

The respective portions of the liquid crystal television set 200 are connected with each other through the buses (transmission paths) 5, to be capable of transferring control signals and control data to each other. The external input terminal 6, the network communication portion 7 and the receiving portion 9 are connected to the AV selector 10 having a function of switching input/output of image and sound signals.

The AV selector 10 is connected to the AV decoder 11 for decoding the image and sound signals received from the receiving portion 9. The AV decoder 11 has a function of decoding (the codes of) the image signal and the sound signal separated by the AV selector 10 and generating image data and sound data.

The AV decoder 11 is connected to the sound processing portion 12 processing the sound signal received from the AV decoder 11 and the image processing portion 13 processing the image signal received from the AV decoder 11. The sound processing portion 12, controlled by the control portion 4, has a function of outputting sounds of a digital television broadcast program or the like to the speaker portion 3 after performing D/A conversion (digital-to-analog conversion). The image processing portion 13, controlled by the control portion 4, has a function of displaying an image of the digital television broadcast program or the like on the display portion 1.

Figure 3:
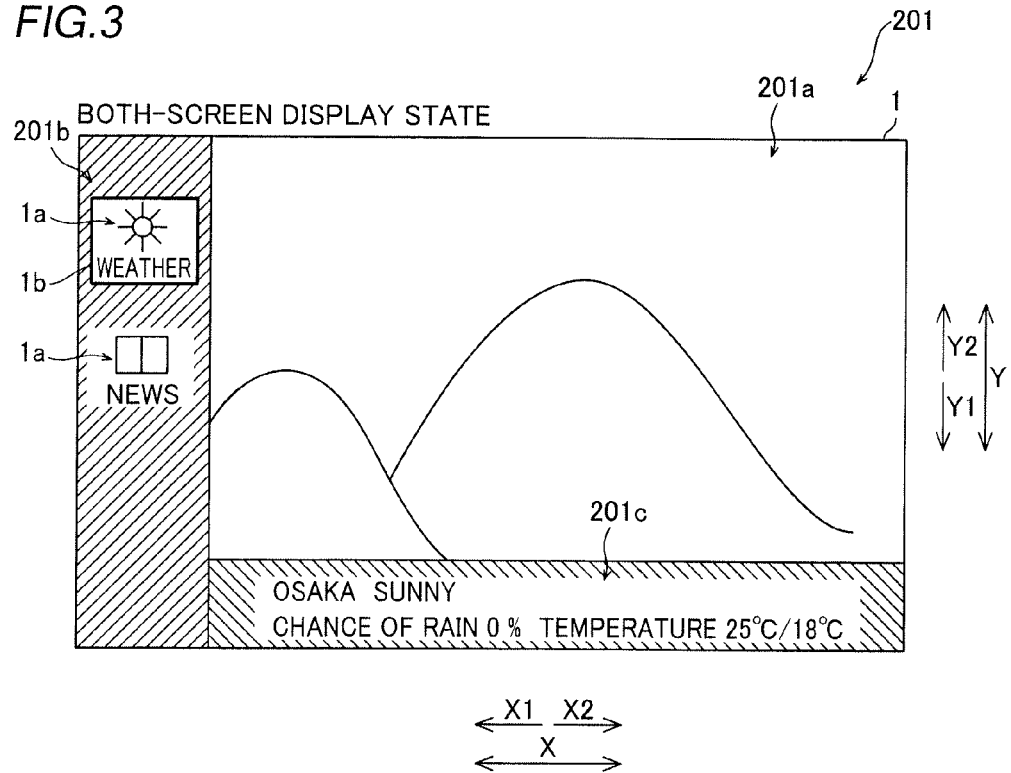
FIG. 3 is a diagram showing a screen in a both-screen display state displayed on a display portion of the liquid crystal television set according to the embodiment of the present invention.

According to this embodiment, the display portion 1 is formed to display the screen 201 including an image display region 201a on which the image is displayed and a content display region 201c on which information of the content updated in real time is displayed, as shown in FIG. 3.

Icons 1a for selecting or deciding the information of the content (weather, news or the like) displayed on the content display region 201c are displayed on a menu display region 201b. These icons 1a are displayed to correspond to respective pieces of the content. A user operates up and down buttons of selection buttons 304a on the remote control 300 described later thereby selecting from among the icons 1a and operates a decision button 304b on the remote control 300 thereby deciding from among the icons 1a. A cursor 1b is displayed to surround a selected icon 1a.

When content of "weather" is selected, for example, information (Osaka, sunny, chance of rain 0%, temperature 25° C./18° C.) of the content relating to "weather" is displayed on the content display region 201c. When content of "news" is selected on the menu display region 201b, information of the content relating to "news" is displayed on the content display region 201c. A user operates right and left buttons of the selection buttons 304a on the remote control 300 described later, whereby information of content displayed on the content display region 201c is switched (a page is scrolled).

According to this embodiment, the menu display region 201b and the content display region 201c are displayed on the display portion 1 such that a width (a length protruding in a direction $X_2$ (horizontal direction) from an end side (side)) of the menu display region 201b in a direction X (horizontal direction) and a width (a length protruding in a direction Y2 (vertical direction) from an end side (lower side)) of the content display region 201c in a direction Y (vertical direction) are enlarged or reduced independently from each other on the basis of the user's operation of the remote control 300 or receipt of the updated information of the content. The width of the menu display region 201b and the width of the content display region 201c are enlarged or reduced independently from each other, whereby the screen 202 in a standby state, the screen 203 in a viewing state, the screen 204 in a mode selection state or the screen 205 in a full-screen display state, described later, is displayed on the display portion 1. As shown in FIG. 3, a state where both the menu display region 201b and the content display region 201c are displayed on the display portion 1 is a "both-screen display state".

The menu display region 201b is arranged on an end side (side) of the screen 201 in a direction X1 (horizontal direction). The width (the length protruding in the direction X2 from the end side (side)) of this menu display region 201b in the direction X is about 15% of a length of the screen 201 in the X direction. The content display region 201c is arranged on an end side (lower side) of the screen 201 in a direction Y1 (vertical direction). The width (the length protruding in the direction Y2 from the end side (lower side)) of this content display region 201c in the direction Y is about 15% of a length of the screen 201 in the Y direction. The menu display region 201b and the content display region 201c are arranged to overlap with the image display region 201a displayed on the display portion 1, and a portion of the image display region 201a overlapping with the menu display region 201b and the content display region 201c cannot be viewed.

Figure 4:
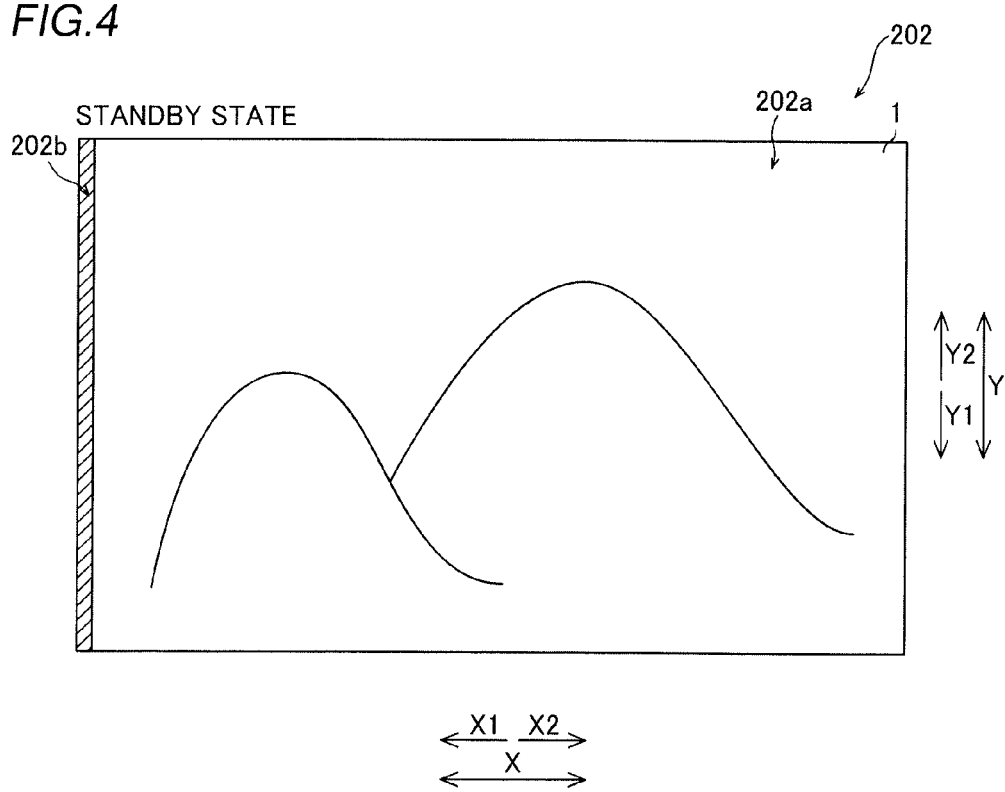
FIG. 4 is a diagram showing a screen in a standby state displayed on the display portion of the liquid crystal television set according to the embodiment of the present invention.

As shown in FIG. 4, a function of viewing content is run on the basis of the user's operation of a viewing mode button 307 of the remote control 300 for running a function of viewing content, described later. In a state (standby state) after the function of viewing content is run, the screen 202 including an image display region 202a on which the image is displayed and a menu display region 202b on which the menu is displayed is displayed on the display portion 1. The menu display region 202b is arranged on an end side (side) of the screen 202 in the direction X1, and a width of the menu display region 202b in the direction X is about 3% of a width of the screen 202 in the direction X (horizontal direction). On the screen 202 in a standby state, a content display region is not displayed. On the menu display region 202b, the icons 1a are not displayed.

Figure 5:
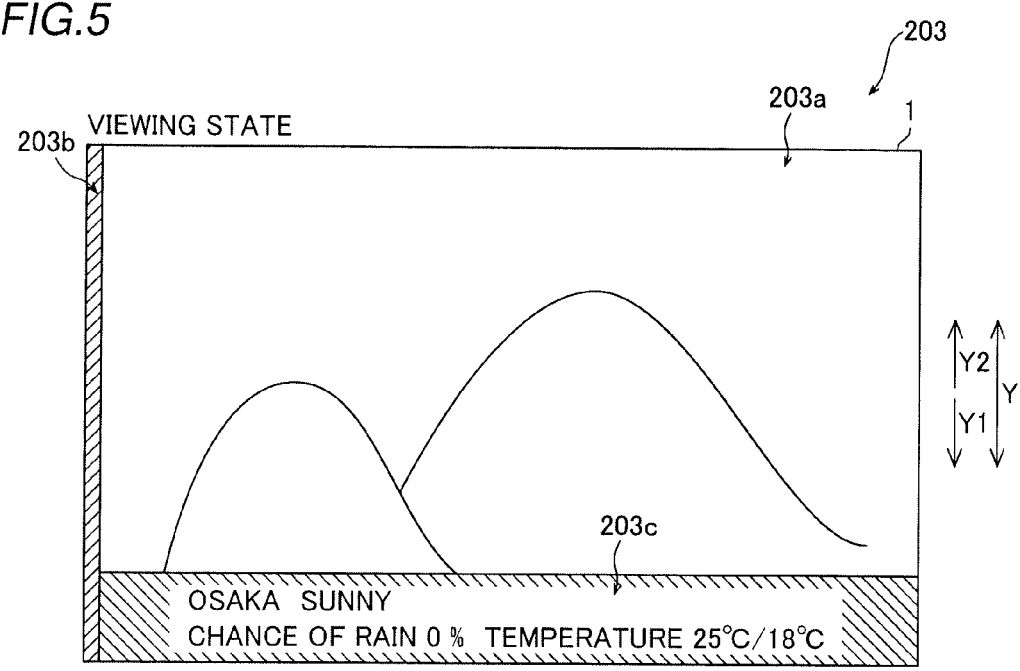
FIG. 5 is a diagram showing a screen in a viewing state displayed on the display portion of the liquid crystal television set according to the embodiment of the present invention.

As shown in FIG. 5, in a state (viewing state) where information of the content can be viewed, the screen 203 including an image display region 203a on which the image is displayed, a menu display region 203b on which the menu is displayed and a content display region 203c on which the information of the content updated in real time is displayed is displayed on the display portion 1. The menu display region 203b is arranged on an end side (side) of the screen 203 in the direction X1, and a width of the menu display region 203b in the direction X is about 3% of a width of the screen 203 in the direction X (horizontal direction). On the menu display region 203b, the icons 1a are not displayed.

The content display region 203c is arranged on an end side (lower side) of the screen 203 in the direction Y1 (vertical direction), and a width of the content display region 203c in the direction Y (vertical direction) is about 15% of a width of the screen 203 in the direction Y. On the content display region 203c, the information of the selected content is displayed. When the content of news is selected, for example, the information of the content of news is displayed on the content display region 203c in order from newly arriving information (the latest information).

Figure 6:
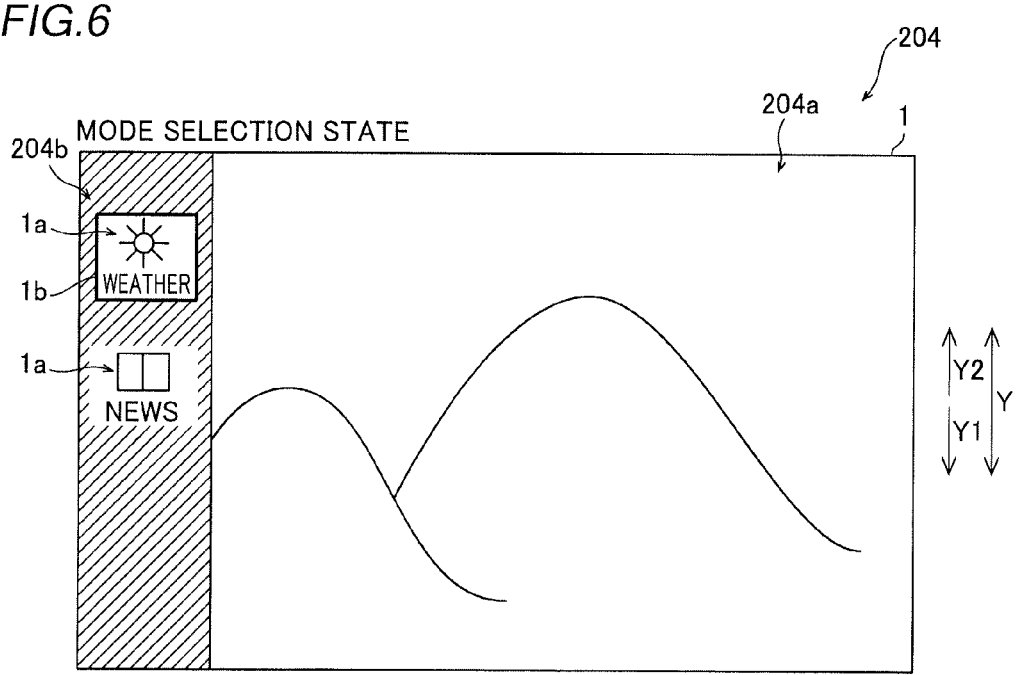
FIG. 6 is a diagram showing a screen in a mode selection state displayed on the display portion of the liquid crystal television set according to the embodiment of the present invention.

As shown in FIG. 6, in a state (mode selection state) of mode selection for changing content, the screen 204 including an image display region 204a on which the image is displayed and a menu display region 204b on which the menu is displayed is displayed on the display portion 1. The menu display region 204b is arranged on an end side (side) of the screen 204 in the direction X1 (horizontal direction), and a width of the menu display region 204 in the direction X is about 15% of a width of the screen 204 in the direction X (horizontal direction). On the menu display region 204b, the icons 1a corresponding to the content of weather, news, etc. are displayed, and the user selects and decides from among the icons 1a, whereby the type of the content can be changed.

Figure 7:
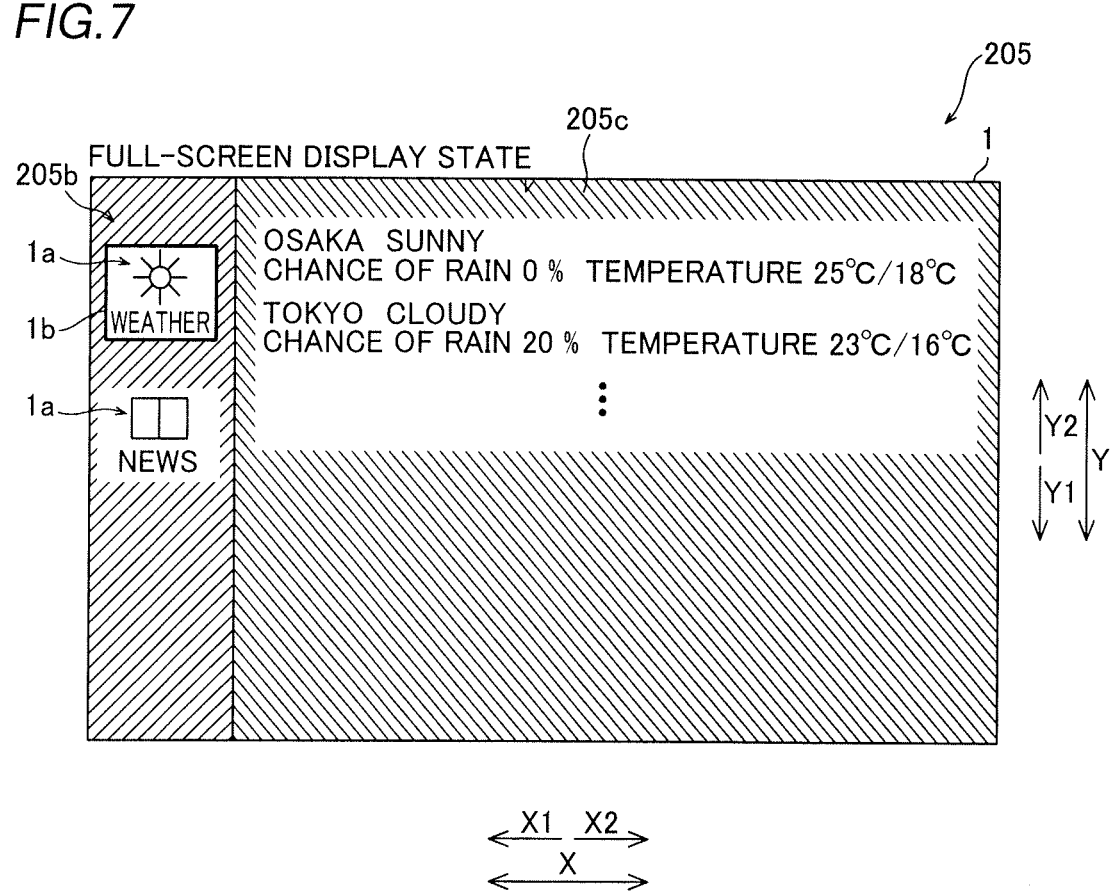
FIG. 7 is a diagram showing a screen in a full-screen display state displayed on the display portion of the liquid crystal television set according to the embodiment of the present invention.

As shown in FIG. 7, in a state (full-screen display state) of displaying both the menu and the information of the content full-screen, the screen 205 including a menu display region 205b on which the menu is displayed and a content display region 205c on which the information of the content updated in real time is displayed is displayed on the display portion 1. The menu display region 205b is arranged on an end side (side) of the screen 205 in the direction X1 (horizontal direction), and a width of the menu display region 205b in the direction X is about 15% of a width of the screen 205 in the direction X (horizontal direction). On this menu display region 205b, the icons 1a corresponding to the content of weather, news, etc are displayed, and the user selects and decides from among the icons 1a, whereby the type of the content can be changed. The screen 205 in a full-screen display state displays the information of the content while the content display region 205c is enlarged to an entire display region of the screen 205 other than the menu display region 205b.

As shown in FIG. 1, the remote control 300 includes an infrared light emitting portion 301 for transmitting a signal to the infrared light receiving portion 2 of the liquid crystal television set 200 when the user operates the remote control 300, a power supply button 302 for turning on/off the liquid crystal television set 200, a plurality of channel selection buttons 303, the four cross-key selection buttons 304a for selecting display content displayed on the display portion 1, the decision button 304b for deciding the display content, volume control buttons 305, channel up/down buttons 306 and the viewing mode button 307 for running the function of viewing content.

As shown in FIG. 2, the remote control 300 further includes a control portion 308 controlling the overall remote control 300. The control portion 308 is connected to the infrared light emitting portion 301, the selection buttons 304a and the decision button 304b.

The menu display region 201b (202b, 203b, 204b, 205b) is arranged to extend in a longitudinal direction (direction Y) along a side of the display portion 1 in the direction X1. The content display region 201c (203c, 205c) is arranged to extend in a transverse direction (direction X) along a lower side of the display portion 1 in the direction Y1.

Figure 8:
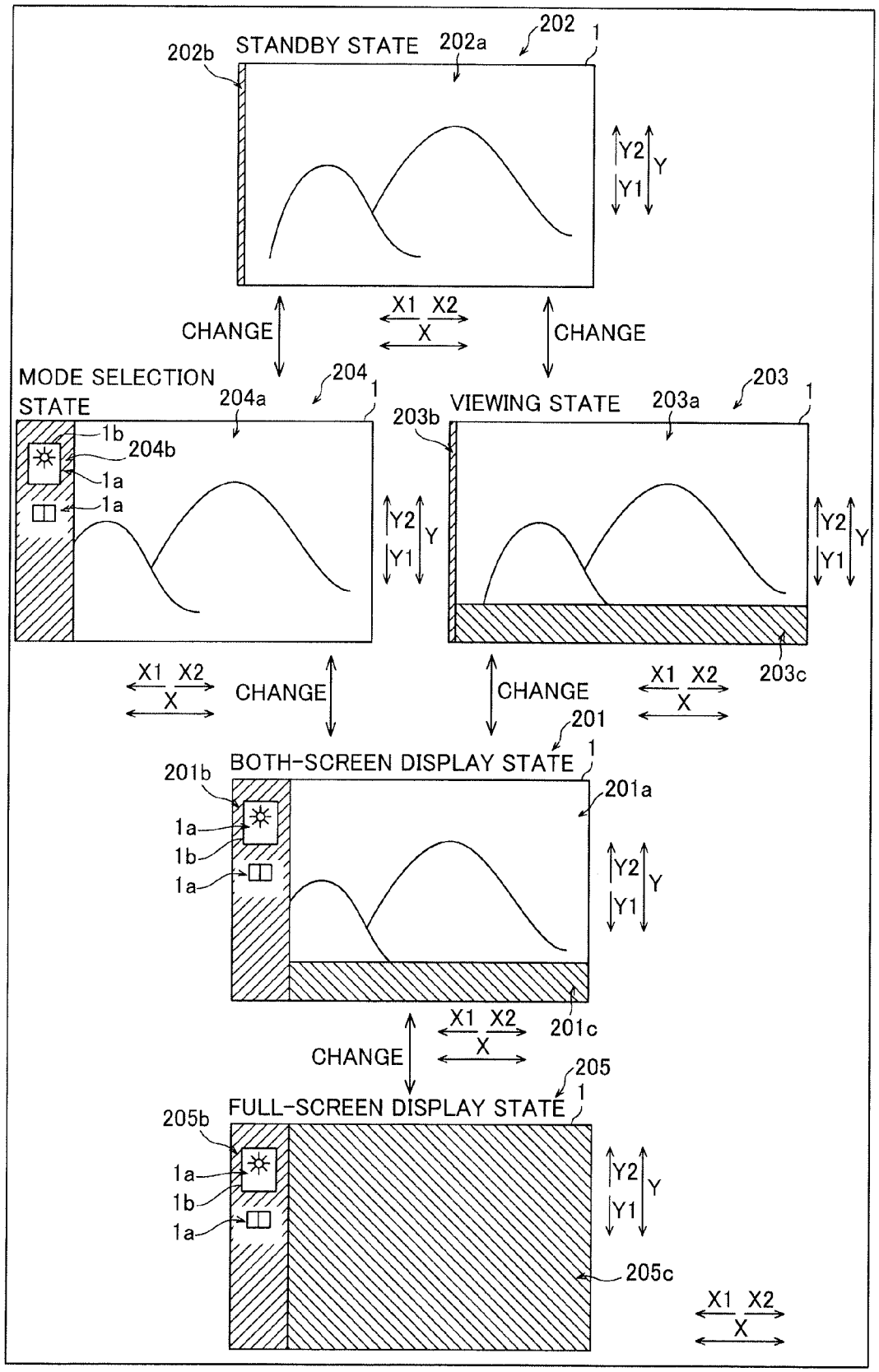
FIG. 8 is a diagram for illustrating a change of a display state of a screen displayed on the display portion of the liquid crystal television set according to the embodiment of the present invention.

Next, transitional motion of the menu display regions 201b to 205b and the content display regions 201c, 203c and 205c of the screens 201 to 205 displayed on the display portion 1 in each state (a standby state, a viewing state, a mode selection state, a both-screen display state and a full-screen display state) is described with reference to FIG. 8.

First, the screen 202 in a standby state is displayed on the display portion 1 when the function of viewing content is run on the basis of the user's operation of the remote control 300. At this time, on the screen 202 in a standby state, the menu display region 202b is arranged on the end side (side) of the screen 202 in the direction X1 in a state where the menu display region 202b reduced in width (to a width of about 3% of the width of the screen 202 in the direction X) is displayed. When updated information (newly arriving information) of the content are received in the standby state, a content display region gradually emerges in the direction Y2 from an end side (lower side) of the screen 202 in a standby state in the direction Y1 and is displayed (in animation mode). Thus, the screen 202 in a standby state changes to the screen 203 in a viewing state. Then, the updated information of the content is displayed on the content display region 203c of the screen 203 in a viewing state.

After the entire updated information of the content is displayed on the screen 203 in a viewing state, the content display region 203c is gradually reduced in the direction Y1 thereby being hidden in a case where there is no user's operation for a certain period of time, so that the screen 203 in a viewing state changes to the screen 202 in a standby state.

When the user operates the remote control 300 at the time of display of the screen 203 in a viewing state, the menu display region 201b gradually emerges in the direction X2 from the end side (side) of the screen 203 in the direction X1 and is enlarged (to a width of about 15% of a width of the screen 201 in the direction X (horizontal direction)). Thus, the screen 203 in a viewing state changes to the screen 201 in a both-screen display state. Then, the icons 1a corresponding to the respective pieces of the content are displayed on the menu display region 201b.

At the time of display of the screen 201 in a both-screen display state, the user selects or decides from among the icons 1a displayed on the menu display region 201b, whereby content displayed on the content display region 201c or display format of content (displaying content from that exhibiting the latest update date, that exhibiting the oldest one or the like) can be changed. When updated information of the content is received at the time of display of the screen 201 in a both-screen display state, the updated information (newly arriving information) of the content is displayed on the content display region 201c. In a case where there is no user's operation for a certain period of time, the menu display region 201b is gradually restored in the direction X1 thereby being reduced (to a width of about 3% of the width of the screen 201 in the direction X), so that the screen 201 in a both-screen display state changes to the screen 203 in a viewing state.

When the user operates the remote control 300 at the time of display of the screen 202 in a standby state, the menu display region 204b gradually emerges in the direction X2 from the end side (side) of the screen 202 in the direction X1 and is enlarged (to a width of about 15% of the width of the screen 204 in the direction X (horizontal direction)). Thus, the screen 202 in a standby state changes to the screen 204 in a mode selection state. Then, the icons 1a corresponding to the respective pieces of the content are displayed on the menu display region 204b.

At the time of display of the screen 204 in a mode selection state, the user selects or decides from among the icons 1a displayed on the menu display region 204b, whereby content displayed on a content display region or display format of content (displaying content from that exhibiting the latest update date, that exhibiting the oldest one or the like) can be changed. In a case where there is no user's operation for a certain period of time, the menu display region 204b is gradually restored in the direction X1 thereby being reduced (to a width of about 3% of the width of the screen 204 in the direction X (horizontal direction)), so that the screen 204 in a mode selection state changes to the screen 202 in a standby state.

When information of content is changed or update of information of content is confirmed in response to the user's operation of the remote control 300 at the time of display of the screen 204 in a mode selection state, the content display region 201c gradually emerges in the direction Y2 from an end side (lower side) of the screen 204 in the direction Y1 and is displayed. Thus, the screen 204 in a mode selection state changes to the screen 201 in a both-screen display state. After the updated information of the content is displayed on the content display region 201c of the screen 201 in a both-screen display state, the content display region 201c is gradually reduced in the direction Y1 thereby being hidden in a case where there is no user's operation for a certain period of time, so that the screen 201 in a both-screen display state changes to the screen 204 in a mode selection state.

When the menu display region 201b and the content display region 201c are switched to full-screen display in response to the user's operation of the remote control 300 at the time of display of the screen 201 in a both-screen display state, the content display region 201c is gradually enlarged in the direction Y2 from the end side (lower side) of the screen 201 in the direction Y1. Thus, the screen 201 in a both-screen display state changes to the screen 205 in a full-screen display state. Then, the content display region 205c is enlarged to a display region of the display portion 1 other than the menu display region 205b and displayed. When the full-screen display state is terminated in response to the user's operation of the remote control 300, the content display region 205c is gradually reduced in the direction Y1 (to a width of about 15% of a width of the screen 205 in the direction Y), so that the screen 205 in a full-screen display state changes to the screen 201 in a both-screen display state.

According to this embodiment, as hereinabove described, the image output system 100 is provided with the control portion 4 controlling the menu display region 201b (202b, 203b, 204b, 205b) on which the menu of the content is displayed and the content display region 201c (203c, 205c) on which the information of the content is displayed independently from each other and controlling the display portion 1 to display the menu display region 201b (202b, 203b, 204b, 205b) and the content display region 201c (203c, 205c), whereby the information of the content can be displayed without displaying the menu by the control portion 4, and hence the operation for displaying the information of the content can be inhibited from complication, dissimilarly to a case where the information of the content is displayed through the menu display region 201b (202b, 203b, 204b, 205b).

According to this embodiment, as hereinabove described, the control portion 4 displays the menu display region 201b (202b, 203b, 204b, 205b) and the content display region 201c (203c, 205c) on the display portion 1, enlarging or reducing the width of the menu display region 201b (202b, 203b, 204b, 205b) and the width of the content display region 201c (203c, 205c) independently from each other, whereby the menu display region 201b (202b, 203b, 204b, 205b) and the content display region 201c (203c, 205c) can be enlarged or reduced separately depending on whether the menu or the information of the content is displayed, dissimilarly to a case where the menu display region 201b (202b, 203b, 204b, 205b) and the content display region 201c (203c, 205c) are enlarged or reduced simultaneously.

According to this embodiment, as hereinabove described, when receiving the updated information of the content, the control portion 4 causes the content display region 201c (203c, 205c) to emerge gradually while enlarging the width of the content display region 201c (203c, 205c) and displays the updated information of the content on the content display region 201c (203c, 205c), whereby the content display region 201c (203c, 205c) dynamically emerges, and hence the content display region 201c (203c, 205c) can be displayed prominently. Thus, the user can more easily recognize update of the information of the content.

According to this embodiment, as hereinabove described, the control portion 4 arranges the menu display region 201b (202b, 203b, 204b, 205b) on the end side (side) of the display portion 1 in the direction X1 while arranging the content display region 201c (203c, 205c) on the end side (lower side) of the display portion 1 in the direction Y1 and displays the menu display region 201b (202b, 203b, 204b, 205b) and the content display region 201c (203c, 205c) on the display portion 1, enlarging or reducing a length of the menu display region 201b (202b, 203b, 204b, 205b) in the direction X protruding from the end side (side) of the display portion 1 in the direction X1 and a length of the content display region 201c (203c, 205c) in the direction Y protruding from the end side (lower side) of the display portion 1 in the direction Y1 independently from each other, whereby the menu display region 201b (202b, 203b, 204b, 205b) is rendered longer in the vertical direction, and hence the menu can be displayed in the longitudinal direction (direction Y). Further, the content display region 201c (203c, 205c) is rendered longer in the horizontal direction, and hence the information of the content is displayed in the transverse direction (direction X (horizontal direction)) when the information of the content is written horizontally such as in English, for example, whereby the information of the content can be easily viewed.

According to this embodiment, as hereinabove described, the control portion 4 arranges the menu display region 201b (202b, 203b, 204b, 205b) to extend in the longitudinal direction (direction Y) along the side of the display portion 1 in the direction X1 and arranges the content display region 201c (203c, 205c) to extend in the transverse direction (direction X) along the lower side of the display portion 1 in the direction Y1 while controlling the content display region 201c (203c, 205c) and the menu display region 201b (202b, 203b, 204b, 205b) independently from each other. Thus, the menu can be easily displayed in the longitudinal direction (direction Y) on the menu display region 201b (202b, 203b, 204b, 205b) arranged to extend in the longitudinal direction (direction Y) along the side of the display portion 1 in the direction X1. Further, the information of the content written horizontally such as in English, for example, can be easily displayed on the content display region 201c (203c, 205c) arranged to extend in the transverse direction (direction X) along the lower side of the display portion 1 in the direction Y1.

According to this embodiment, as hereinabove described, in the standby state after the function of viewing the content is run on the basis of the user's operation, the control portion 4 displays the menu display region 202b, reducing the width of the menu display region 202b while not displaying the content display region, whereby the width of the menu display region 202b is reduced and the menu display region 202b reduced in width is displayed, and hence the user can easily recognize that the function of viewing the content is run while the vicinity of an end side of the image displayed on the display portion 1 is inhibited from being hidden by the menu display region 202b.

According to this embodiment, as hereinabove described, when the standby state changes to the state where the information of the content can be viewed on the basis of the user's operation or the receipt of the updated information of the content, the control portion 4 maintains a state of displaying the menu display region 203b, reducing the width of the menu display region 203b while enlarging the width of the content display region 203c to display the content, whereby the width of the menu display region 203b is reduced and the menu display region 203b reduced in width is displayed, and hence the information of the content displayed on the content display region 203c can be viewed while the vicinity of the end side of the image displayed on the display portion 1 is inhibited from being hidden by the menu display region 203b.

According to this embodiment, as hereinabove described, when the information of the content is updated, the control portion 4 informs the user that the updated information of the content has been received by displaying that on the display portion 1 before the standby state changes to the state where the information of the content can be viewed, whereby the user can easily recognize that the information of the content updated in the standby state has been received.

According to this embodiment, as hereinabove described, when the standby state changes to the state of mode selection for changing the viewed content on the basis of the user's operation, the control portion 4 enlarges the width of the menu display region 204b to display the menu while not displaying the content display region, whereby the content display region is not displayed, and hence the user can select or decide from among the menu displayed on the menu display region 204b while the vicinity of the end side of the image displayed on the display portion 1 is inhibited from being hidden by the content display region.

According to this embodiment, as hereinabove described, the user can select whether to display the information of the content in order from the newest one or the oldest one in the state of mode selection, whereby the information of the content can be easily arranged in order from the newest one or the oldest one to be displayed on the content display region 201c (203c, 205c).

According to this embodiment, as hereinabove described, when either the state where the information of the content can be viewed or the state of mode selection changes to a state of displaying both the menu and the information of the content on the basis of the user's operation, the control portion 4 enlarges the width of the menu display region 201b to display the menu while enlarging the width of the content display region 201c to display the information of the content, whereby the user can view the information of the content displayed on the content display region 201c while selecting or deciding from among the menu displayed on the menu display region 201b.

According to this embodiment, as hereinabove described, when the state of displaying both the menu and the content changes to the state of displaying the menu display region 205b and the content display region 205c full-screen on the basis of the user's operation, the control portion 4 enlarges the content display region 205c to the entire display region of the display portion 1 other than the menu display region 205b and displaying the information of the content, whereby a display area of the content display region 205c is increased as compared with a case where the content display region 205c is arranged on the end side of the display portion 1, and hence more information of the content can be displayed.

According to this embodiment, as hereinabove described, the control portion 4 controls the menu display region and the content display region independently from each other so as to change the screen to the state of displaying the menu display region, reducing the size of the menu display region or a state of displaying the menu, enlarging the size of the menu display region and change the screen to a state of not displaying the content display region or a state of displaying the information of the content, enlarging the size of the content display region when there is no user's operation for a certain period of time. Thus, display states of the menu display region 201b (202b, 203b, 204b, 205b) and the content display region 201c (203c, 205c) can be changed in a case where there is no user's operation for a certain period of time, and hence the user can easily recognize that he/she has not operate the remote control for a certain period of time.

According to this embodiment, as hereinabove described, in a case where there is no user's operation for a certain period of time, the control portion 4 reduces the menu display region 202b (203b) or the content display region gradually when changing the screen to the state of displaying the menu display region 202b (203b), reducing the size of the menu display region 202b (203b) or the state of not displaying the content display region. Thus, the menu display region 202b (203b) or the content display region is dynamically reduced, and hence the menu display region 202b (203b) or the content display region can attract attention.

Thus, the menu display region 202b (203b) or the content display region is reduced dynamically, and hence the menu display region 202b (203b) or the content display region can attract attention.

Although the present invention has been described and illustrated in detail, it is clearly understood that the same is by way of illustration and example only and is not to be taken by way of limitation, the spirit and scope of the present invention being limited only by the terms of the appended claims.

For example, while the liquid crystal television set is employed as the example of the image receiving apparatus according to the present invention in the aforementioned embodiment, the present invention is not restricted to this. The image receiving apparatus may alternatively be applied to an STB (set-top box), a DVD recorder or the like other than the liquid crystal television set, for example. In this case, a display portion for displaying the screen including the menu display region and the content display region may be connected to the STB or the DVD recorder.

Figure 9:
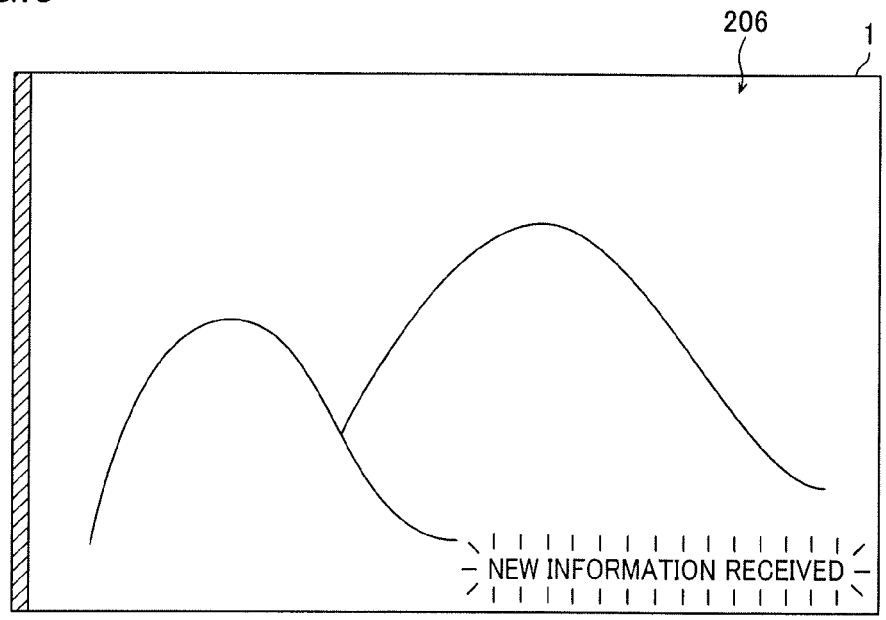
FIG. 9 is a diagram showing a first modification of a screen displayed on the display portion of the liquid crystal television set according to the embodiment of the present invention.

While the information of the content is automatically displayed on the content display region without requiring the user's operation in the viewing state when the updated information of the content is received in the aforementioned embodiment, the present invention is not restricted to this. The user may alternatively be informed that the updated information of the content has been received by displaying a message, "new information received" on a screen 206 before the standby state changes to the state where the information of the content can be viewed, when the updated information of the content is received, as in a modification of the embodiment shown in FIG. 9, for example.

Figure 10:
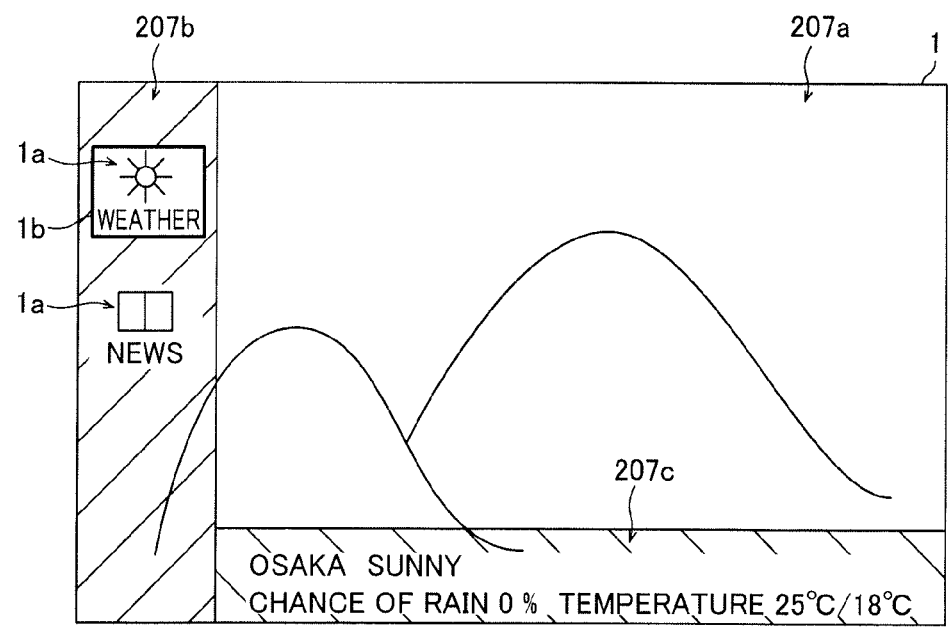
FIG. 10 is a diagram showing a second modification of a screen displayed on the display portion of the liquid crystal television set according to the embodiment of the present invention.

While the portion of the image display region overlapping with the menu display region and the content display region cannot be viewed in the aforementioned embodiment, the present invention is not restricted to this. A portion of an image display region 207*a* overlapping with a menu display region 207*b* and a content display region 207*c* may alternatively be viewable by displaying the menu display region 207*b* and the content display region 207*c* transparently as in a modification of the embodiment shown in FIG. 10, for example. The degree of transparency of the menu display region 207*b* and the content display region 207*c* may be arbitrarily user-settable.

While the menu display region is arranged on the end side (side) of the screen in the direction X1, and the content display region is arranged on the end side (lower side) of the screen in the direction Y1 in the aforementioned embodiment, the present invention is not restricted to this. For example, the menu display region may alternatively be arranged on an end side (side) of the screen in the direction X2, and the content display region may alternatively be arranged on an end side (upper side) of the screen in the direction Y2.

While the information of the content relating to "weather" and "news" is displayed on the content display region in the aforementioned embodiment, the present invention is not restricted to this. For example, information relating to "SNS (Social Network Services)", which is a community type website, may alternatively be displayed on the content display region.

While the menu display region is displayed with a width of about 3% or about 15% of the width of the screen, and the content display region is displayed with a width of about 15% or 100% (full-screen) of the width of the screen in the aforementioned embodiment, the present invention is not restricted to this. In the present invention, the menu display region may alternatively be displayed with a width other than a width of about 3% or about 15% of the width of the screen, and the content display region may alternatively be displayed with a width other than a width of about 15% or 100% of the width of the screen.

While the function of viewing the content is run on the basis of the user's operation of the viewing mode button of the remote control in the aforementioned embodiment, the present invention is not restricted to this. For example, the image output system may alternatively be so formed that the user can previously set the image output system to run the function of viewing the content simultaneously with turning on the liquid crystal television set.

What is claimed is:

1. An image receiving apparatus comprising:
   a communication portion capable of receiving content through a network; and
   a control portion controlling a menu display region on which a menu of said content is displayed and a content display region on which information of said content is displayed so as to overlap with an image display region, and controlling a display portion to display said menu display region and said content display region transparently so that an image which is displayed in said image display region is viewable, and
   said control portion is formed to control said menu display region, reducing a display area of said menu display region in a standby state in which a function of viewing said content is running after said function of viewing said content is run on a basis of a user's operation.

2. The image receiving apparatus according to claim 1, wherein
   said control portion is formed to display said menu display region and said content display region on said display portion, changing a display area of said menu display region and a display area of said content display region.

3. The image receiving apparatus according to claim 2, wherein
   said control portion is formed to display said menu display region and said content display region on said display portion, changing a display area of said menu display region and a display area of said content display region independently from each other.

4. The image receiving apparatus according to claim 3, wherein
   said control portion is formed to display said menu display region and said content display region on said display portion, enlarging or reducing a display area of said menu display region and a display area of said content display region independently from each other.

5. The image receiving apparatus according to claim 3, wherein
   said control portion is formed to cause said content display region to emerge gradually while enlarging the display area of said content display region and display updated information of said content on said content display region when said updated information of said content is received.

6. The image receiving apparatus according to claim 3, wherein
   said control portion is formed to arrange either said menu display region or said content display region on a side of said display portion while arranging either said content display region or said menu display region on an upper side or a lower side of said display portion, and display said menu display region and said content display region on said display portion, enlarging or reducing a length of said menu display region protruding from an end side of said display portion and a length of said content display region protruding from an end side of said display portion independently from each other.

7. The image receiving apparatus according to claim 6, wherein
   said control portion is formed to arrange said menu display region on said side of said display portion while arranging said content display region on said upper side or said lower side of said display portion, and display said menu display region and said content display region on said display portion, enlarging or reducing a length of said menu display region protruding from said side of said display portion and a length of said content display region protruding from said upper side or said lower side of said display portion independently from each other.

8. The image receiving apparatus according to claim 7, wherein
   said control portion is formed to arrange said menu display region to extend in a longitudinal direction along said side of said display portion and arrange said content display region to extend in a transverse direction along said upper side or said lower side of said display portion while controlling said menu display region and said content display region independently from each other.

9. The image receiving apparatus according to claim 3, wherein
said control portion is formed to control said menu display region and said content display region independently from each other so as to display said menu display region, reducing the display area of said menu display region while not displaying said content display region in a standby state in which a function of viewing said content is running after said function of viewing said content is run on the basis of a user's operation.

10. The image receiving apparatus according to claim 9, wherein
said control portion is formed to control said menu display region and said content display region independently from each other so as to maintain a state of displaying said menu display region, reducing the display area of said menu display region while enlarging the display area of said content display region to display said content when said standby state changes to a state where said information of said content can be viewed on the basis of a user's operation or receipt of updated information of said content.

11. The image receiving apparatus according to claim 10, wherein
said control portion is formed to inform a user that updated information of said content has been received by displaying that on said display portion before said standby state changes to said state where said information of said content can be viewed, when said information of said content is updated.

12. The image receiving apparatus according to claim 9, wherein
said control portion is formed to control said menu display region and said content display region independently from each other so as to display said menu, enlarging the display area of said menu display region while not displaying said content display region when said standby state changes to a state of mode selection for changing viewed said content on the basis of a user's operation.

13. The image receiving apparatus according to claim 12, wherein
said control portion is so formed that a user can select whether to display said information of said content in order from the newest one or the oldest one in said state of mode selection.

14. The image receiving apparatus according to claim 12, wherein
said control portion is formed to control said menu display region and said content display region independently from each other so as to display said menu, enlarging the size of said menu display region and display said information of said content, enlarging the size of said content display region when either said state where said information of said content can be viewed or said state of mode selection changes to a state of displaying both said menu and said information of said content on the basis of a user's operation.

15. The image receiving apparatus according to claim 14, wherein
said control portion is formed to control said menu display region and said content display region independently from each other so as to display said information of said content, enlarging said content display region to an entire display region of said display portion other than said menu display region when said state of displaying both said menu and said content changes to a state of displaying said menu display region and said content display region full-screen on the basis of a user's operation.

16. The image receiving apparatus according to claim 3, wherein
said control portion is formed to control said menu display region and said content display region independently from each other so as to change a screen to a state of displaying said menu display region, reducing a size of said menu display region or a state of displaying said menu, enlarging a size of said menu display region and change a state of not displaying said content display region or a state of displaying said information of said content, enlarging the size of said content display region when there is no user's operation for a certain period of time.

17. The image receiving apparatus according to claim 16, wherein
said control portion is formed to reduce said menu display region or said content display region gradually when a screen changes to said state of displaying said menu display region, reducing the size of said menu display region or said state of not displaying said content display region, in a case where there is no user's operation for a certain period of time.

18. A liquid crystal television set comprising:
a receiving portion for receiving a television broadcast signal;
a display portion displaying an image of said television broadcast;
a communication portion capable of receiving content through a network; and
a control portion controlling a menu display region on which a menu of said content is displayed and a content display region on which information of said content is displayed so as to overlap with an image display region, and controlling said display portion to display said menu display region and said content display region transparently so that the image which is displayed in said image display region is viewable, and
said control portion is formed to control said menu display region, reducing a display area of said menu display region in a standby state in which a function of viewing said content is running after said function of viewing said content is run on a basis of a user's operation.

19. The liquid crystal television set according to claim 17, wherein
said control portion is formed to display said menu display region and said content display region on said display portion, changing a display area of said menu display region and a display area of said content display region.

20. The liquid crystal television set according to claim 19, wherein
said control portion is formed to display said menu display region and said content display region on said display portion, changing a display area of said menu display region and a display area of said content display region independently from each other.

21. The liquid crystal television set according to claim 20, wherein
said control portion is formed to display said menu display region and said content display region on said display portion, enlarging or reducing a display area of said menu display region and a display area of said content display region independently from each other.

22. The liquid crystal television set according to claim 20, wherein
said control portion is formed to cause said content display region to emerge gradually while enlarging the display area of said content display region and display updated information of said content on said content display region when said updated information of said content is received.

23. The liquid crystal television set according to claim 20, wherein
said control portion is formed to arrange either said menu display region or said content display region on a side of said display portion while arranging either said content display region or said menu display region on an upper side or a lower side of said display portion, and display said menu display region and said content display region on said display portion, enlarging or reducing a length of said menu display region protruding from an end side of said display portion and a length of said content display region protruding from an end side of said display portion independently from each other.

24. The liquid crystal television set according to claim 23, wherein
said control portion is formed to arrange said menu display region on said side of said display portion while arranging said content display region on said upper side or said lower side of said display portion, and display said menu display region and said content display region on said display portion, enlarging or reducing a length of said menu display region protruding from said side of said display portion and a length of said content display region protruding from said upper side or said lower side of said display portion independently from each other.

* * * * *